United States Patent [19]

Haas et al.

[11] Patent Number: 5,011,696
[45] Date of Patent: Apr. 30, 1991

[54] MALT FLAVOR MATERIAL AND PREPARATION THEREOF

[75] Inventors: Gerhard J. Haas, Woodcliff Lake; Karen G. Heller, Livingston, both of N.J.

[73] Assignee: Kraft General Foods, Inc., Glenview, Ill.

[21] Appl. No.: 491,794

[22] Filed: Mar. 12, 1990

[51] Int. Cl.$^5$ ................................................ A23L 1/22
[52] U.S. Cl. ...................................... 426/28; 426/533; 426/20; 426/18
[58] Field of Search ...................... 426/18, 28, 20, 533

[56] References Cited

U.S. PATENT DOCUMENTS

| | | | |
|---|---|---|---|
| 3,615,697 | 10/1971 | Hollenbeck | 426/18 |
| 4,663,168 | 5/1987 | Von Fulger et al. | 426/28 |
| 4,752,482 | 6/1988 | Fulger et al. | 426/28 |

*Primary Examiner*—Joseph Golian
*Attorney, Agent, or Firm*—Thomas A. Marcoux; Linn I. Grim; Thomas R. Savoie

[57] ABSTRACT

A concentrated, cooked-grain flavorant which is heat stable and of low volatility is prepared for incorporation into a foodstuff, preferably a ready-to-eat cereal or biscuit. This flavorant is produced by producing a slurry of distillers malt flour, advisably with gelatin or gelatin hydrolysate. The slurry is prepared at a concentration and processed at a temperature controlled to favor proteolysis by the naturally occurring proteases in distillers malt. The slurry is then diluted to a concentration and processed at a temperature controlled to favor starch hydrolysis by the naturally occurring amylases in distillers malt. The slurry is then fermented with yeast and may be used as is or further concentrated by known drying techniques.

14 Claims, No Drawings

MALT FLAVOR MATERIAL AND PREPARATION THEREOF

TECHNICAL FIELD

This invention pertains to food flavoring agents and, more particularly, to a strong malt derived flavorant which is heat-stable and able to withstand the rigorous processing conditions of a cooker extruder.

BACKGROUND ART

Recent advances in the food art have resulted in the preparation of extruded dough products which have desirable functionality and certain organoleptic characteristics such as texture. However, these products lack sufficient flavor due to the short time, high temperatures, and pressure drop of the extrusion process. Traditionally, starch-based food products were more flavorful because the longer processing times employed allowed the flavor precursors to develop through such steps as cooking, tempering, baking, and toasting. These traditional methods of processing took several hours while today's modern extruder can produce similar products in under one minute.

Many attempts have been made to produce flavorants, the addition of which would augment the deficient flavor profiles of extruded food products. The inventions resulting from these attempts seem to rely upon malt as a primary constituent. Malt, especially that obtained from barley, is known as an important carrier of flavorable grain and cereal flavors. U.S. Pat. No. 3,615,697 issued to Hollenbeck specifically discloses a process by which whey is added to Lactobacillus bacteria and malt, and the mixture is fermented to form a heat-labile, volatile food flavorant. This flavorant, while combining the desirable malt flavor with the sour taste of lactic acid and the related fermented flavors, would not be sufficiently stable to adequately withstand the rigorous conditions of the extruder. U.S. Pat. Nos. 4,663,168 and 4,752,482, issued to Fulger and Lou disclose processes by which malt is fermented by yeast to form a heat-stable, low volatile food flavorant which attempts to duplicate the typical cooked grain flavors. However, upon extrusion, these flavorants do not produce as strong, a cooked-grain flavor as compared to the product produced by this invention.

SUMMARY OF INVENTION

It is a general object of the present invention to form a concentrated flavorant which yields a cereal flavor when added to foods, especially to those processed at high temperatures and short times, to improve their flavor and texture without significant heat degradation. It is a further objective of this invention to produce such a flavorant from a malt.

These and other objects are accomplished according to the present invention which provides for a new class of flavorants derived from distillers malt. The process involves the preparation of a slurry which consists of distillers malt, water and optionally gelatin or gelatin hydrolysate. The concentration of this slurry is controlled, as is its temperature, so as to favor proteolysis of the protein constituent present in the distillers malt and gelatin or gelatin hydrolysate by the naturally occurring proteases in distillers malt. Then the concentration and temperature are changed so as to favor hydrolysis of the starch components by the naturally occurring amylases in distillers malt. Finally, the slurry is fermented by yeast to develop further flavor compounds. The slurry can be added as is or dried by known techniques for future use. Certain drying techniques, i.e., those involving heat, are also believed to develop further flavor components.

DETAILED DESCRIPTION OF INVENTION

The present invention relates to a process for producing a heat-stable, cereal flavorant from distillers malt. Distillers malt is dried at a much lower temperature than brewers malt or caramel malt, the malts commonly used in cereal manufacturing. By drying the malt at lower temperatures, there is far less destruction of malt's naturally occurring enzymes, i.e., proteases and amylases.

Distillers malt may be obtained from barley, rye, wheat, or other grains. However, that obtained from barley is most generally used in the cereal industry.

It has been shown that the amino acid proline produces positive flavor notes in cereal products. Proline is a major constituent of gelatin. However, enzymatic hydrolysis of gelatin with approved organism enzymes or from commercially available plant proteases often fail to sufficiently hydrolyze for significant flavor production.

Gelatin or gelatin hydrolysate may be added to distillers malt and then processed so as to take advantage of the naturally occurring enzymes in distillers malt to hydrolyze the gelatin sufficiently to produce ample proline for a flavorant. This is accomplished by choosing conditions which are favorable to the activity of the enzyme, both processing temperatures and slurry concentrations. It is known that protease activity is favored by concentrated slurries and moderate temperatures.

Processing of distillers malt will also take advantage of the naturally occurring amylases found in the distillers malt. These conditions, in contrast to those which favor protease activity, constitute more dilute slurries and higher processing temperatures. In this manner, the polymeric carbohydrates in the distillers malt are partially broken down to reducing sugars.

At this point, fungal or bacterial amylases may be added to further hydrolyze the polymeric components, thus increasing the reducing sugars available for yeast fermentation. These reducing sugars are also available for Maillard browning during subsequent heat treatment.

The resulting reducing sugars can then be used to sustain the growth of various yeasts, primarily those in the genus Saccharomyces.

These slurries may then either be incorporated directly into a food composition, such as a cereal product, or may preferentially be dried for future use. Drying may be accomplished using any of a variety of known methods, including drum-drying, freeze-drying, or spray-drying. It is believed that those methods involving heat further develop the overall flavor of the compound.

The flavorants of this invention may best be prepared by first combining a mixture of distillers malt flour with up to about 25% preferably from about 5% to about 15%, of gelatin and/or gelatin hydrolysate by weight. The distillers malt used should be debranned since the bran contains constituents which may lead to bitter or off-flavors upon processing. The distillers malt flour should be of a particle size from about 20 microns to about 400 microns.

Water is added to the distillers malt mixture to produce a slurry of from about 20% to about 50%, preferably from about 30% to about 35%, by weight solids. This slurry is heated to a temperature between about 40° C. and about 55° C., preferably from about 45° C. and about 50° C., and held for a period of time of from about 15 minutes up to about 3 hours, preferably from about 30 minutes to about 150 minutes. The slurry is preferably agitated lightly during this time. These conditions should favor the protease activity.

The slurry may then be diluted with additional water if necessary to form a slurry of from about 10% to about 35%, preferably from about 15% to about 20%, by weight of solids. The temperature is then increased to between about 50° C. and about 65° C., preferably from about 55° C. to about 60° C., and held for a period of time of from about 15 minutes to about 2 hours, preferably between 30 minutes and about 90 minutes. The slurry is preferably agitated lightly during this time. These conditions should favor the amylase activity.

The resulting flavorant precursor slurries should then be heated at conditions of sufficient temperature and time to inactivate the majority of the distillers malt enzymes, in accordance with known techniques. The pH and temperature of the slurry may then be adjusted to favor yeast fermentation.

The slurry is then fermented with yeast, preferably *S. cerevisiae*, for a period of time up to about 5 days, preferably from about 24 to about 72 hours at a fermenting temperature of from about 25° C. to about 40° C. The fermented slurry is then heated at a temperature and for a period of time sufficient to inactivate the yeast. The resulting flavorant may then be incorporated directly into a food composition, i.e., an extruded cereal, or may be dried, preferably to a moisture of less than about 10% for future incorporation by known drying methods. Possible methods of drying the slurry include drum-drying, spray-drying and freeze-drying, though methods which involve heat, i.e., drum-drying, are preferred as it is believed that the heat yields further development of the flavor components.

The resulting flavorant is heat stable, exhibiting a strong cereal flavor. These characteristics make the flavorants of this invention especially desirable for incorporation into processed foods produced by high temperature, short time cooker extrusion.

The flavorants of this invention may be incorporated alone or in combination with another flavorant into any food composition or used in conjunction with any edible material. The term edible material is broad and includes anything edible whether or not intended for nutrition, i.e., it can be a functional ingredient such as a carrier or diluent for use in flavorings. Representative of edible materials which can contain the flavorants of this invention are: bakery products, i.e., cakes, breads, rolls, pastries, cookies, biscuits, and savory crackers; cereals, ready-to-eat and prepared, hot and cold; snack foods, extruded and baked; frozen desserts; as well as additive delivery systems.

EXAMPLES

The following Examples are presented to further illustrate and explain the present invention and should not be taken as limiting in any regard. Unless otherwise indicated, all parts and percentages are by weight, and are based on the weight at the particular stage of the process being described.

EXAMPLE 1

| Concentrated Flavorant Mix thoroughly; | |
|---|---|
| Ingredient | Parts |
| Distillers malt | 10.0 |
| Gelatin | 1.0 |
| Water | 20.0 |

Heat slurry to 50° C., and hold at this temperature for 2 hours. Increase temperature to 60° C. over the next half-hour.

| | |
|---|---|
| Add; Water | 30.0 |

Hold at 60° C. for 1 hour. Increase temperature to 75° C. over the next half-hour. Hold temperature at 75° C. for half-hour. Slurry should be agitated at about 200 rpm up to this point. Adjust pH to 4.8, cool to 30° C., and add;

| | |
|---|---|
| Yeast | 1.8 |

Ferment for 72 hours at 30° C. Drum-fry to form concentrated flavorant.

EXAMPLE 2

| Concentrated Flavorant Mix thoroughly; | |
|---|---|
| Ingredient | Parts |
| Distillers malt | 10.0 |
| Gelatin Hydrolysate | 1.0 |
| Water | 20.0 |

Heat slurry to 50° C., and hold at this temperature for 1 hour. Increase temperature to 60° C. over the next half-hour.

| | |
|---|---|
| Add; Water | 30.0 |

Hold at 60° C. for 1 hour. Increase temperature to 75° C. over the next half-hour. Hold temperature at 75° C. for half-hour. Slurry should be agitated at about 200 rpm up to this point. Adjust pH to 4.8, cool to 30° C., and add;

| | |
|---|---|
| Yeast | 1.8 |

Ferment for 72 hours at 30° C. Drum-dry to form concentrated flavorant.

EXAMPLE 3

The flavorants of Example 1 or 2 may be incorporated into a ready-to-eat cereal by the following procedure.

The conventional ingredients for a ready-to-eat cereal, including flour, water, sugar, flavorants and from about 1% to about 4% of the dry flavorants of Example 1 and/or 2 are mixed together by known techniques and passed through a high temperature, high pressure extruder under standard processing conditions. The resulting product may then be further processed, i.e., toasted, frosted, to produce a ready-to-eat cereal product.

EXAMPLE 4

The flavorants of Example 1 or 2 may be incorporated into a biscuit by the following procedure.

The conventional ingredients for a biscuit, including flour, shortening, leavening, water, sugar, flavorants and from about 1% to about 4% of the dry flavorants of Example 1 and/or 2 are mixed together and formed by known techniques. The biscuits are then baked under standard processing conditions to produce a final biscuit product.

The above description is for the purpose of teaching the person in the art how to practice the present invention and it is not intended to detail all those obvious modifications and variations of it which will become apparent to the skilled worker upon reading the description. It is intended, however, that all obvious modifications and variations, as used herein, be included within the scope of the present invention, which is defined by the following claims.

What is claimed is:

1. A process for producing a heat-stable, low volatile, yeast fermented malt flavorant comprising:
   (a) preparing a mixture containing distillers malt flour with 0 to 25% gelatin, by weight;
   (b) adding water to the mixture of step (a) to produce a slurry containing 20% to 50% by weight solids;
   (c) heating the slurry to a first temperature of from about 40° C. to about 55° C. for a first time period of about 15 minutes to about 180 minutes;
   (d) diluting the slurry to about 10% to about 35% solids;
   (e) heating the slurry to a second temperature of from about 50° C. to about 65° C.;
   (f) holding the slurry at the second temperature for a second time period of from about 15 minutes to about 120 minutes;
   (g) fermenting the slurry with yeast at a fermenting temperature of from about 25° C. to about 40° C. for a fermenting time period of from about 24 hours to about 120 hours; and
   (h) heating the slurry at a temperature and for a period of time sufficient to inactivate the yeast.

2. The process according to claim 1 wherein the gelatin has been previously partially hydrolyzed.

3. The process according to claim 1 wherein the first temperature of step (c) is from about 45° C. to about 50° C.

4. The process according to claim 1 wherein the first time period is from about 30 minutes to about 150 minutes.

5. The process according to claim 1 wherein the second temperature is from about 55° C. to about 60° C.

6. The process of claim 1 wherein the second time period is from about 30 minutes to about 90 minutes.

7. The process according to claim 1 wherein the mixture of step (a) comprises from about 5% to about 15% gelatin.

8. The process according to claim 1 wherein the slurry of step (b) contains about 30% to about 35% by weight solids.

9. The process of claim 1 wherein the slurry in step (d) is diluted to from about 15% to about 20% solids.

10. The process according to claim 1 wherein the yeast is *S. cerevisiae*.

11. The process of claim 1 further comprising subsequent drying of the slurry to a moisture content of less than about 10%.

12. The process according to claim 1 further comprising the step of inactivating the enzymes prior to the fermentation of step (g).

13. The process according to claim 1 further comprising the step of adding microbial amylases prior to the fermentation of step (g).

14. The product according to claim 1.

* * * * *